United States Patent
Choi

(10) Patent No.: US 10,616,595 B2
(45) Date of Patent: Apr. 7, 2020

(54) DISPLAY APPARATUS AND CONTROL METHOD THEREFOR

(71) Applicant: Samsung Electronics Co., Ltd., Gyeonggi-do (KR)

(72) Inventor: Yoon-hee Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 85 days.

(21) Appl. No.: 15/760,517

(22) PCT Filed: Jul. 21, 2016

(86) PCT No.: PCT/KR2016/007955
§ 371 (c)(1),
(2) Date: Mar. 15, 2018

(87) PCT Pub. No.: WO2017/065394
PCT Pub. Date: Apr. 20, 2017

(65) Prior Publication Data
US 2018/0255313 A1 Sep. 6, 2018

(30) Foreign Application Priority Data

Oct. 14, 2015 (KR) .................... 10-2015-0143655

(51) Int. Cl.
*H04N 19/467* (2014.01)
*H04N 21/235* (2011.01)
(Continued)

(52) U.S. Cl.
CPC ......... *H04N 19/467* (2014.11); *H04N 21/235* (2013.01); *H04N 21/43* (2013.01);
(Continued)

(58) Field of Classification Search
CPC .... H04N 19/467; H04N 21/235; H04N 21/43; H04N 21/4345; H04N 21/45; H04N 21/4532; H04N 21/835
See application file for complete search history.

(56) References Cited

U.S. PATENT DOCUMENTS

| 7,917,645 B2 | 3/2011 | Ikezoye et al. |
| 8,776,105 B2 | 7/2014 | Sinha et al. |

(Continued)

FOREIGN PATENT DOCUMENTS

| EP | 2763427 | 6/2014 |
| KR | 101155465 | 6/2012 |

(Continued)

OTHER PUBLICATIONS

PCT/ISA/237 Written Opinion issued on PCT/KR2016/007955 (pp. 11).
PCT/ISA/210 Search Report issued on PCT/KR2016/007955 (pp. 4).

*Primary Examiner* — David F Dunphy
(74) *Attorney, Agent, or Firm* — The Farrell Law Firm, P.C.

(57) ABSTRACT

A display apparatus and a control method therefor are provided. Contents are displayed, a fingerprint is extracted from the displayed contents, it is determined whether there exists a prestored fingerprint that matches the extracted fingerprint, and when the prestored fingerprint that matches the extracted fingerprint exists, a fingerprint corresponding to the remaining sections of the contents is received from a server.

13 Claims, 13 Drawing Sheets

(51) Int. Cl.
*H04N 21/43* (2011.01)
*H04N 21/45* (2011.01)
*H04N 21/835* (2011.01)
*H04N 21/434* (2011.01)

(52) U.S. Cl.
CPC ......... *H04N 21/4345* (2013.01); *H04N 21/45* (2013.01); *H04N 21/4532* (2013.01); *H04N 21/835* (2013.01)

(56) References Cited

U.S. PATENT DOCUMENTS

| | | | |
|---|---|---|---|
| 8,848,108 | B2 | 9/2014 | Kim et al. |
| 8,856,817 | B2 | 10/2014 | Sinha et al. |
| 2006/0187358 | A1* | 8/2006 | Lienhart ............ G06K 9/00711 348/661 |
| 2013/0205318 | A1 | 8/2013 | Sinha et al. |
| 2014/0013352 | A1 | 1/2014 | Shavit et al. |
| 2014/0089815 | A1 | 3/2014 | Gildfind et al. |
| 2014/0115618 | A1 | 4/2014 | Harada et al. |
| 2014/0195548 | A1 | 7/2014 | Harron |
| 2015/0106389 | A1 | 4/2015 | Conwell |
| 2015/0163528 | A1 | 6/2015 | An et al. |
| 2015/0254497 | A1* | 9/2015 | Jang ....................... G06F 16/51 382/124 |
| 2015/0256905 | A1 | 9/2015 | Lee et al. |
| 2016/0112771 | A1 | 4/2016 | Choi et al. |

FOREIGN PATENT DOCUMENTS

| | | |
|---|---|---|
| KR | 101310943 | 9/2013 |
| KR | 1020140067792 | 6/2014 |
| KR | 1020150104358 | 9/2015 |
| KR | 1020150104422 | 9/2015 |
| KR | 1020160044954 | 4/2016 |
| WO | WO 2012/070901 | 5/2012 |

* cited by examiner

DISPLAY APPARATUS AND CONTROL METHOD THEREFOR

PRIORITY

This application is a National Phase Entry of International Application No. PCT/KR2016/007955, which was filed on Jul. 21, 2016, and claims priority to Korean Patent Application No. 10-2015-0143655, which was filed on Oct. 14, 2015, the content of each of which is incorporated herein by reference.

TECHNICAL FIELD

The present disclosure pertains to a display apparatus and a controlling method thereof, and more particularly, to a display apparatus which extracts a fingerprint from a displayed content, determines matching with a fingerprint corresponding to a part of a section of the prestored content, and recognizes a content, and a controlling method thereof.

BACKGROUND ART

There is an increasing need to recognize information about the currently played advertisement in order to perform an overlay advertisement capable of interacting with the user while the advertisement is played back on the display apparatus or analyze the advertisement effect. That is, there is an increasing need to efficiently recognize the displayed content.

Conventionally, a method of matching content with a fingerprint stored in an external server is advantageous in that a server can store a large amount of content, but there is a disadvantage that a matching period of the extracted fingerprint is long. A method of matching content with a fingerprint stored in a storage in a display apparatus is advantageous in that a matching period is short, but is disadvantageous in that only a relatively small amount of content can be stored.

Accordingly, there is a necessity of storing a large number of contents and matching in a short cycle.

DISCLOSURE

Technical Problem

It is an object of the present invention to provide a display apparatus capable of efficiently recognizing contents by storing a fingerprint corresponding to a section of a content having a high level of importance in a storage of a display apparatus, and a control method thereof.

Technical Solution

According to an exemplary embodiment, a control method includes displaying a content; extracting a fingerprint from the displayed content; identifying whether there is a prestored fingerprint matching the extracted fingerprint; and when there is a prestored finger print matching the extracted fingerprint, receiving a fingerprint corresponding to remaining sections of the content from a server.

When there is no prestored fingerprint matching the extracted fingerprint, the method may further include transmitting the extracted fingerprint to the external server; and receiving a fingerprint of an entire section of a content matching the extracted fingerprint from the server.

When the extracted fingerprint is a fingerprint that is inserted in a middle of the matched content, the receiving may include receiving a fingerprint corresponding to remaining sections of the matched content.

The receiving may further include identifying whether a fingerprint corresponding to remaining sections of the content is stored; and when a fingerprint corresponding to the remaining sections is not stored, receiving a fingerprint corresponding to the remaining sections.

The method may further include storing the receiving fingerprint and updating the prestored fingerprint.

The method may further include receiving a fingerprint corresponding to a part of the sections of a plurality of contents from the server and storing the same.

The server may identify a first type content and a second type content according to a level of importance of the stored content, and the receiving and storing may include receiving and storing a fingerprint corresponding to a part of sections of the first type content of which a level of importance is higher than a level of importance of the second type content.

The server may identify a third type content and a fourth type content according to a reproduction time of the stored content, and wherein the receiving and storing may include receiving and storing a fingerprint corresponding to a part of sections of the third type content of which a reproduction time is shorter than the fourth type content.

When the reproduction of the content being ended, the method may further include deleting a fingerprint corresponding to the received remaining section.

According to an exemplary embodiment, a display apparatus includes a storage; a display; a communicator; and a controller configured to: control the display, extract a fingerprint from the displayed content, identify whether there is a prestored fingerprint that matches the extracted fingerprint, when there is a prestored fingerprint that matches the extracted fingerprint, controls the communicator to receive a fingerprint corresponding to the remaining section of the content.

The controller, when there is no prestored fingerprint that matches the extracted fingerprint, may control the communicator to transmit the extracted fingerprint to the server, and receive a fingerprint of an entire section of the content that matches the extracted fingerprint from the server.

When the extracted fingerprint is a fingerprint that corresponds to a middle of the matched content, the controller may control the communicator to receive a fingerprint that corresponds to the remaining section of the matched content.

The controller may identify whether a fingerprint which corresponds to the remaining section of the content is stored, and if a fingerprint which corresponds to the remaining section is not stored, control the communicator to receive a fingerprint which corresponds to the remaining section.

The controller may store the received fingerprint and updates the prestored fingerprint.

The controller may control the communicator to receive a fingerprint which corresponds to a part of sections of the plurality of contents and control the storage to store the received fingerprint.

In addition, the server may identify a first type of content and a second type of content according to the importance of the stored content, and the controller may receive, from the server, the first type content having higher importance than the second type content. The controller may control the storage to store the received fingerprint.

The server may identify the content of the third type and the content of the fourth type according to the playback time of the stored content, and the controller receives the third type of content from the server. The controller may control the communicator to receive a fingerprint corresponding to a part of the content of the content, and control the storage to store the received fingerprint.

In addition, the controller, when the playback of the content ends, may delete a fingerprint corresponding to the received remaining section.

In the meantime, according to an exemplary embodiment, a controlling method of a server includes identifying a first type content and a second type content according to a level of importance of the stored content; transmitting a fingerprint corresponding to a part of the section of the first content of which level of importance is higher than the second type content to the display device; and when the first fingerprint is received from the display apparatus, extracting a fingerprint that matches the first fingerprint; and transmitting a fingerprint corresponding to an entire section of a content of the extracted fingerprint to the display apparatus.

Advantageous Effects

As described above, according to various exemplary embodiments, a display apparatus may recognize a displayed content efficiently.

BEST MODE

Figure 1:
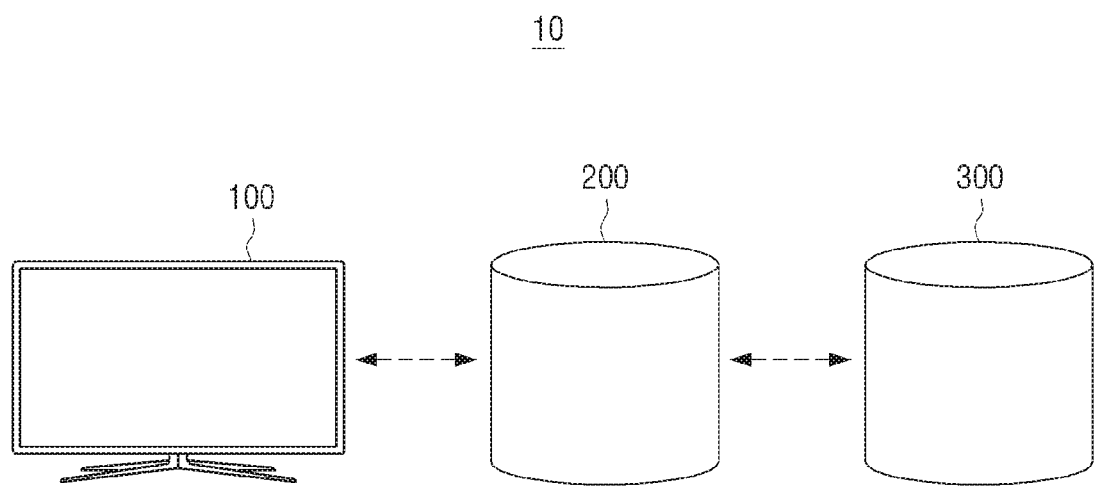
FIG. 1 is a system diagram which illustrates a content recognition system according to an exemplary embodiment.

The terms will be described briefly and exemplary embodiments will be described in greater detail.

Although the terms used in the embodiments of the present disclosure have selected the general terms that are currently widely used, taking into account the functions in this disclosure, they may vary depending on the intention or circumstance of the artisan skilled in the art. Also, in a specific case, there is a term arbitrarily selected by the applicant, and in this case, the meaning will be described in detail in the description of the corresponding embodiments. Therefore, the terms used in these embodiments should be defined based on the meaning of the term, not on the name of a simple term, but on the contents of the embodiments.

In the following description, like drawing reference numerals are used for the like elements, even in different drawings. The matters defined in the description, such as detailed construction and elements, are provided to assist in a comprehensive understanding of exemplary embodiments. However, exemplary embodiments may be practiced without those specifically defined matters. Also, well-known functions or constructions are not described in detail because they would obscure the application with unnecessary detail.

Terms including an ordinal number such as "the first" and "the second" may be used to explain various elements, but the elements are not limited by these terms. The terms are used to distinguish one element from another element. For example, while staying within the claim rights of the present invention, the first element may be named as the second element, and similarly, the second element may be named as the first element. The term "and/or" includes a combination of a plurality of elements or one of the plurality of elements.

The terms used in the present application are provided to describe particular embodiments only, and are not intended to limit and/or the present invention. A singular expression, unless the context clearly used otherwise, includes plural meaning.

In the present application, the term "including" or "having" are intended to specify the features, numbers, steps, operations, elements, components, or combinations thereof which are listed in the specification, and one or more other features should be understood that they do not preclude the features, numbers, steps, operations, elements, components, or combinations thereof, or the presence of additional possibilities. For the reference numeral on each drawing indicates the component which performs substantially the same function.

In the embodiment, a user input may include at least one of a touch input, a bending input, a voice input, a button input, and a multimodal input but it is not limited thereto.

Unless otherwise defined, all terms used herein, including technical or scientific terms, have the same meaning as commonly understood by one of ordinary skill in the art to which this disclosure belongs. Terms such as those defined in commonly used dictionaries should be interpreted as having a meaning consistent with the meaning in the context of the relevant art and are to be interpreted as ideal or overly formal in meaning unless explicitly defined in the present application.

Hereinafter, the present disclosure be described with reference to the drawings. FIG. 1 is a diagram of a content recognition system according to an embodiment of the present disclosure. As illustrated in FIG. 1, the content recognition system includes a display apparatus 100, a server 200, and a content database 300.

The content database 300 stores a plurality of contents. The content database 300 extracts a fingerprint of each of a plurality of stored contents. At this time, the plurality of contents may be an advertisement moving picture or a broadcast program including a plurality of frames. One frame may include audio data such as people, animals, backgrounds, objects, or background music (PGI). In the meantime, the fingerprint is an identifier for capturing contents to be displayed and describing the characteristic features of the frame image or the audio of the contents, and it is possible to identify the contents identically even if the contents are modified.

The server 200 receives a fingerprint of each content from the content database 300 and stores the same. The server 200 may be an automatic content recognition (ACR) server and store a fingerprint corresponding to a large amount of content.

The server 200 may determine a content with a high level of importance and a content with a low level of importance. For example, a content of which playback time is less than or equal to a preset time may be determined as a content with high level of importance. The server 200 may transmit a fingerprint which corresponds to a part of a section of the content of which level of importance is determined to be high to the display apparatus 100.

The display apparatus 100 can receive and store a fingerprint corresponding to a part of the content from the server

200. The display apparatus 100 may display the content, and may capture the displayed content to extract the fingerprint. Then, the display apparatus 100 can determine whether or not there is a fingerprint matched to the extracted fingerprint among the stored fingerprints. If there is a pre-stored fingerprint matching the extracted fingerprint, the display apparatus 100 may receive a fingerprint corresponding to the remaining section of the content from the server 200, When the fingerprint corresponding to the remaining section is received and stored, the display apparatus 100 includes a fingerprint corresponding to the entire section of the displayed content, so that it is possible to perform matching in a short period in the entire section of the contents, and efficiently recognize a content.

Figure 2:
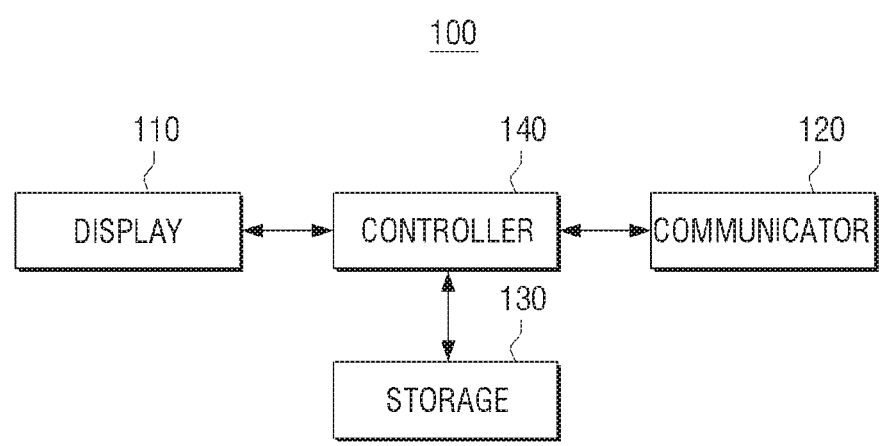
FIG. 2 is a block diagram which briefly illustrates a configuration of a display apparatus according to an exemplary embodiment.

FIG. 2 is a diagram illustrating a configuration of the display apparatus 100 according to an embodiment of the present disclosure. As illustrated in FIG. 2, the display apparatus 100 includes a display 110, a communicator 120, a storage 130, and a controller 140. Meanwhile, the display apparatus 100 according to one embodiment of the present disclosure may be implemented with various display apparatuses such as a smart TV, a tablet PC, a notebook PC, a desktop PC, a smart phone, and the like.

The display 100 outputs video data. In particular, the display 110 may display an advertisement and a broadcast program and display relevant information of an advertisement and a broadcast program as well.

The communicator communicates with an external server. In particular, the communicator 120 may receive a finger printer corresponding to a part of a section of a plurality of contents from the server 200.

The storage 130 stores various modules to operate the display apparatus 100. In particular, the storage 130 may store a fingerprint received through the communicator 120.

The controller 140 controls the overall operation of the display apparatus 100. In particular, the controller 140 may control the communicator 120 to receive a fingerprint corresponding to a partial section of the content from the server 200, and may control the storage 130 to store the received fingerprint. The display apparatus 100 may extract a fingerprint of the displayed content and determine whether there is a fingerprint matched with the fingerprint extracted from the stored fingerprint. If there is a matching fingerprint, the display apparatus 100 may control the communicator 120 to receive a fingerprint corresponding to the remaining section of the content from the server 200.

Specifically, the controller 140 may control the communicator 120 to receive a fingerprint corresponding to a part of a plurality of contents from the server 200, and control the storage 130 to store the received fingerprint. Specifically, the controller 140 checks whether there is a change (for example, addition or deletion) of the content to the server 200 per predetermined period (for example, 30 minutes, 1 hour, etc.), and if there is a content which needs to be deleted, the controller deletes the fingerprint information relating to the content to be deleted in the display apparatus. In addition, when content that needs to store a fingerprint is added to the display apparatus, the controller may control the communicator 120 to receive a fingerprint corresponding to a part of a plurality of contents added from the server 200, and control the storage 130 to store the received fingerprint. In this case, the plurality of contents may be a first type of content that is more important than the second type of contents classified by the server 200, and some of the sections may be a section that is reproduced for a preset time from the start of reproduction.

The controller 140 may control the display 110 to display a content and extract a fingerprint of the displayed content. To be specific, the controller 140 may capture an image or audio of the displayed content or capture a fingerprint using the captured image or audio.

In addition, the controller 140 may determine whether there is a fingerprint which matches the extracted fingerprint from among the stored fingerprints.

When there is a fingerprint matched with the fingerprint extracted from the stored fingerprint, the controller 140 may control the communicator 120 to receive the fingerprint corresponding to the remaining section of the content displayed from the server 200. Specifically, the controller 140 can determine whether the fingerprint corresponding to the remaining section of the content is stored in the storage 130. If the fingerprint corresponding to the remaining section is not stored, the controller 140 may control the communicator 120 to receive the fingerprint corresponding to the remaining section of the content from the server 200. The controller 140 may control the storage 130 to store a fingerprint corresponding to the remaining section of the received content.

If there is no pre-stored fingerprint matching the extracted fingerprint, the controller 140 may control the communicator 120 to transmit the extracted fingerprint to the server 200. The controller 140 may control the communicator 120 to receive the fingerprint of the entire section of the content matched with the fingerprint extracted from the server 200.

Meanwhile, if the extracted fingerprint is a fingerprint inserted in the middle of the matched content, the controller 140 may control the communicator 120 to receive the fingerprint corresponding to the remaining section of the matched content.

Figure 3:
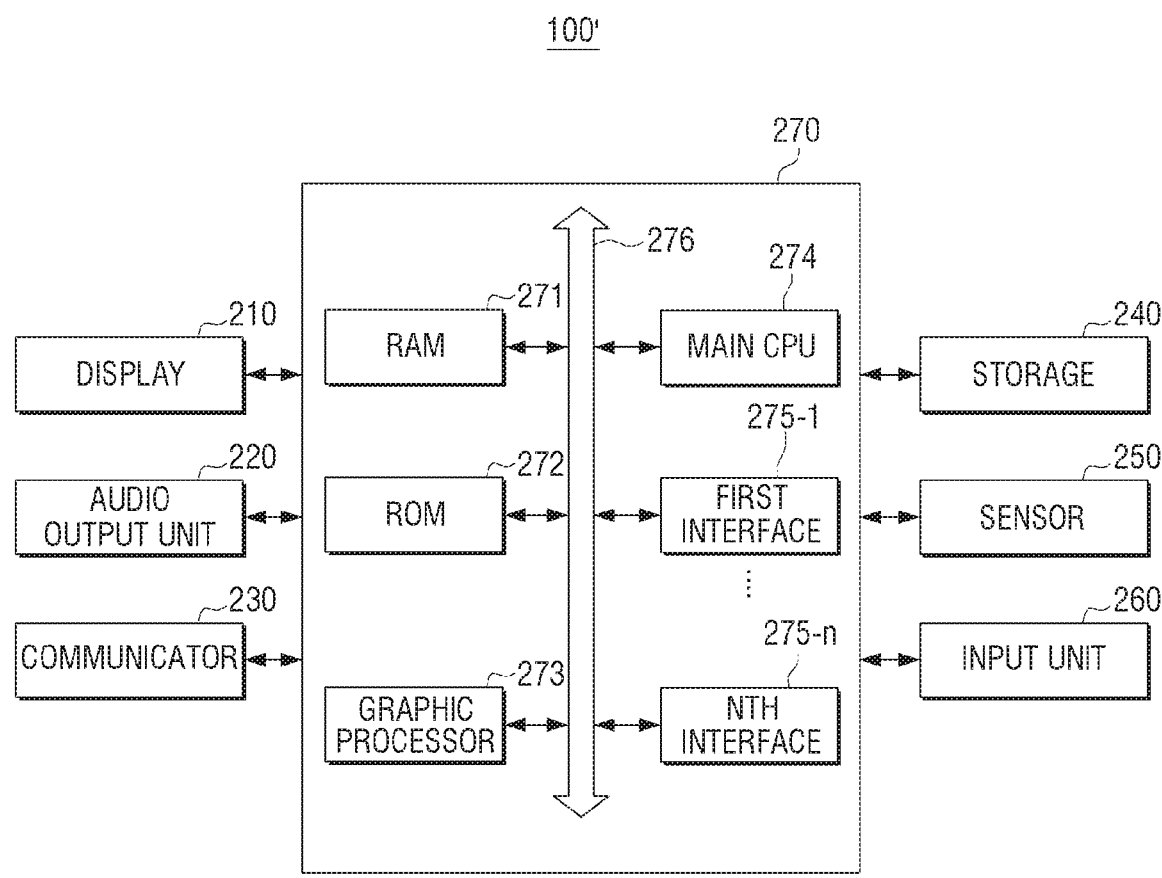
FIG. 3 is a block diagram which illustrates a configuration of a display apparatus according to an exemplary embodiment.

Hereinafter, various embodiments of the present disclosure will be described with reference to FIGS. 3 to 12. FIG. 3 is a block diagram showing details of the configuration of the display apparatus 100, according to an embodiment of the present disclosure. As illustrated in FIG. 3, the display apparatus 100 includes a display 210, an audio output unit 220, a communicator 230, a storage 240, a sensor 250, an input unit 260, and a controller 270.

In the meantime, FIG. 3 illustrates, when the display apparatus 100 is a device having various functions such as a display function and data transceiving function, various elements of the display apparatus. Therefore, according to exemplary embodiments, a part of the elements of FIG. 3 may be omitted or changed and another element may be further included.

The display 210 displays at least one of a video frame processed by the image processing unit (not shown) and various screens generated by the graphic processing unit 273, from the image data received from the image receiving unit (not shown). In particular, the display 210 may display various contents such as an advertisement or a broadcast program. Also, the display 210 may display relevant information corresponding to the content displayed while displaying the content. For example, the display portion 210 may display an overlay advertisement capable of interacting with the user while displaying the advertisement.

The audio output unit 220 is a configuration to output various audio data for which decoding, amplification, noise filtering are processed by the audio processor (not shown) and also various notification sounds and a voice message.

The communicator 230 is configured to perform communication with various types of external devices according to various types of communication methods. The communicator 230 may include various communication chips such as a Wi-Fi chip, a Bluetooth chip, an NFC chip, and a wireless communication chip. At this time, the Wi-Fi chip, the Bluetooth chip, and the NFC chip communicate with each other using the WiFi method, the Bluetooth method, and the NFC method. The NFC chip refers to a chip operating in Near Field Communication (NFC) method using 13.56 MHz band from among various RF-ID frequency bands a such as from 135 kHz, 13.56 MHz, 433 MHz, 860-960 MHz, and 2.45 GHz. When using a Wi-Fi or Bluetooth chip, various connection information such as an SSID and a session key are transmitted and received first, communication is connected, and various information can be transceived. The wireless communication chip refers to a chip that performs communication according to various communication standards such as IEEE, ZigBee, 3rd Generation (3G), 3rd Generation Partnership Project (3GPP), Long Term Evolution (LTE). In particular, the communicator 230 can receive a fingerprint from the server 200.

The storage 240 stores various modules for driving the electronic device 200. For example, the storage 240 may store software including a base module, a sensing module, a communication module, a presentation module, a web browser module, and a service module. In this case, the base module is a base module for processing a signal transmitted from each hardware included in the electronic device 200 and transmitting the signal to the upper layer module. The sensing module is a module for collecting information from various sensors and analyzing and managing the collected information, and may include a face recognition module, a voice recognition module, a motion recognition module, and an NFC recognition module. The presentation module is a module for constructing a display screen, and may include a multimedia module for reproducing and outputting multimedia contents, a UI, and a UI rendering module for performing graphics processing. The communication module is a module for performing communication with the outside. A web browser module refers to a module that accesses a web server by performing web browsing. The service module includes a module including various applications for providing various services.

As described above, the storage 240 may include various program modules, but the various program modules may be omitted, modified or added depending on the type and characteristics of the electronic device 200. For example, when the electronic device 200 is implemented as a tablet PC, the base module may further include a position determination module for determining a GPS-based position, and the sensing module may further include a sensing module for sensing an operation of a user.

In particular, the storage 240 may store a fingerprint. Specifically, the storage 240 may store a fingerprint corresponding to a section of a content having a high level of importance. In addition, the storage 240 may store the updated fingerprint according to a predetermined period.

In an exemplary embodiment, the storage 240 may be defined to include a ROM 272 and RAM 271 inside a controller 270 and a memory card (not shown) (for example, micro SD card and a memory stick) installed in the electronic device 200.

The sensor 250 senses the surrounding environment of the electronic device 200. In particular, the sensor 250 may include various sensors such as a GPS sensor capable of sensing position information, a motion sensor (e.g., a gyro sensor, an acceleration sensor, etc.) capable of sensing movement of the electronic device 200, a pressure sensor, a noise sensor, etc.

The input unit 260 receives a user command for controlling the electronic device 200. In particular, the input unit 260 may include various input devices such as a touch input unit, a button, a voice input unit, a motion input unit, a keyboard, and a mouse to receive a user command.

The storage 270 controls overall operations of the display apparatus 100 using various programs stored in the storage 240.

As illustrated in FIG. 3, the controller 270 includes a RAM 271, a ROM 272, a graphics processing unit 273, a main CPU 274, first through $n^{th}$ interfaces 275-1 through 275-n, and Bus 276. At this time, the RAM 271, the ROM 272, the graphic processor 273, the main CPU 274, the first through $n^{th}$ interfaces 275-1 through 275-n, etc. may be connected to each other via the bus 276.

The ROM 272 stores a command set and the like for booting the system. The main CPU 274 copies the O/S stored in the storage 240 to the RAM 271 according to the command stored in the ROM 272, and executes the O/S to boot the system. When the booting is completed, the main CPU 274 copies various application programs stored in the storage 240 to the RAM 271, executes the application program copied to the RAM 271, and performs various operations.

The graphic processing unit 273 generates a screen including various objects such as a pointer, an icon, an image, and text using an operation unit (not shown) and a rendering unit (not shown). The operation unit calculates an attribute value such as a coordinate value, a shape, a size, and a color to be displayed by each object according to the layout of the screen using the control command received from the input unit. The rendering unit generates screens of various layouts including the objects based on the attribute values calculated by the operation unit. The screen generated by the rendering unit is displayed in the display area of the display unit 210.

The main CPU 274, by accessing the storage 240, performs booting using the O/S stored in the storage 240. The main CPU 274 performs various operations using various programs, contents, and data stored in the storage 240.

The first to $n^{th}$ interfaces 275-1 to 275-n are connected to various components. One of the interfaces may be network interface which is connected to an external device through network.

In particular, the controller 270 controls the storage 240 to store the fingerprint received from the server 200 through the communicator 230, and controls the display unit 210 to display the content. The controller 270 extracts a fingerprint of the displayed content, and determines whether there is a fingerprint matched with the fingerprint extracted from the stored fingerprint. If there is a stored fingerprint matching the extracted fingerprint, the controller 270 controls the communicator 230 to receive the fingerprint corresponding to the remaining section of the content displayed from the server 200.

Figure 4:
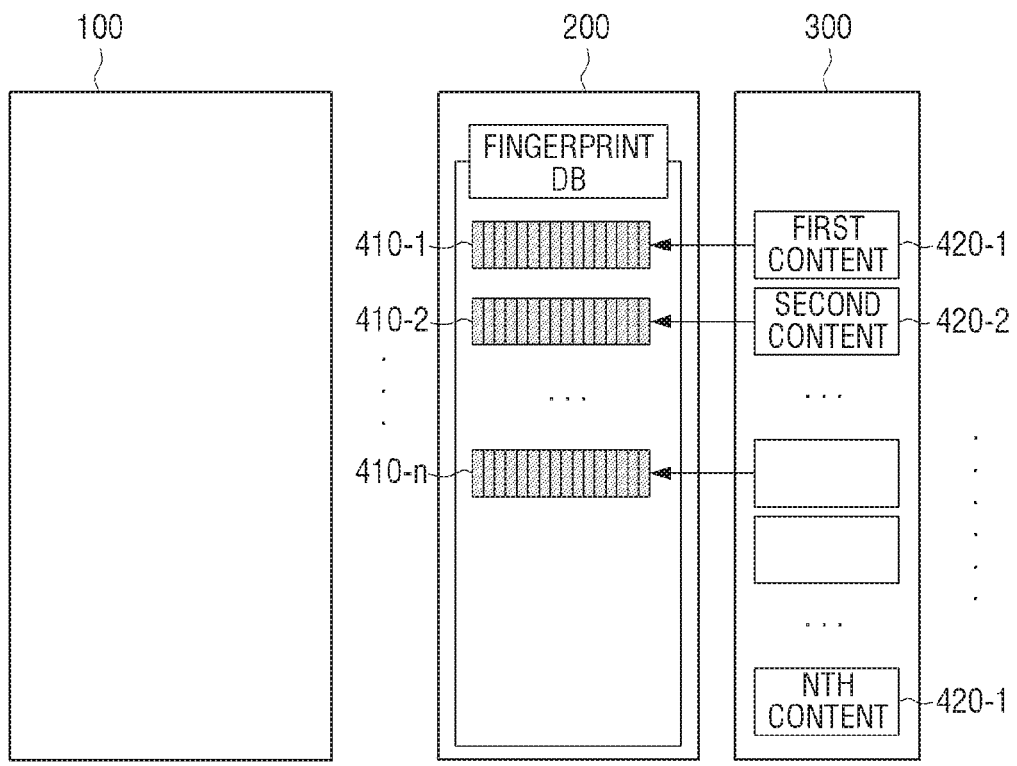
FIGS. 4-12 are drawings to describe various exemplary embodiments of recognizing a content using a finger print according to various exemplary embodiments.

To be specific, as illustrated in FIG. 4, the content database 300 may include a plurality of contents 420-1, 420-2, . . . , 420-n. At this time, the plurality of contents may be advertisement contents, and the contents database 300 may be an advertisement database. In addition, the plurality of contents may be a section of a broadcast program, a movie, or the like. For example, this section may be a section including a Product Placement (PPL) advertisement in a section such as a broadcast program or a movie. The server 200 can extract and store the fingerprint of the content received from the content database 300.

Figure 5:
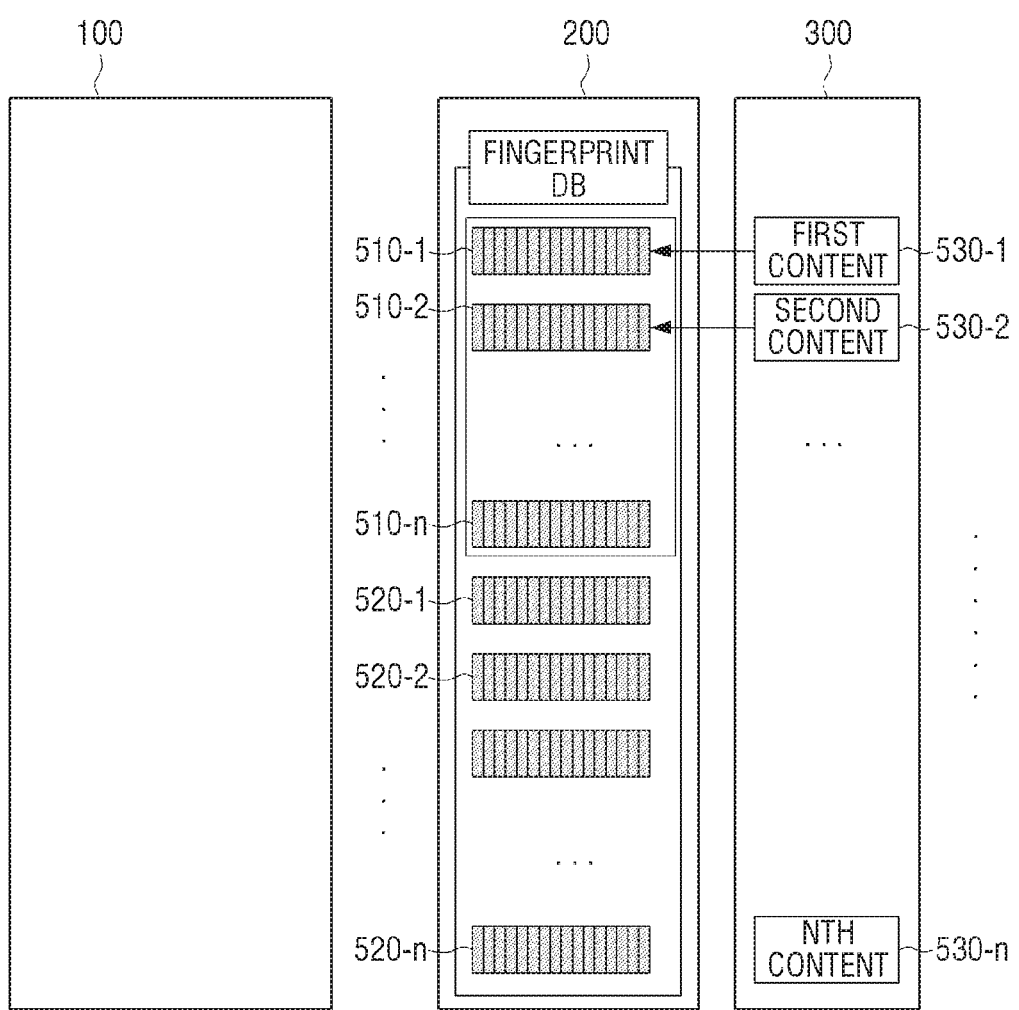

As illustrated in FIG. 5, the server 200 may generate a first type of fingerprint 510-1, 510-2, . . . , 510-n and a second type of fingerprint 520-1, 520-2, . . . , 520-n. Specifically, it is important to determine whether the content having a short playback time is matched in a short period of time. Therefore, the server 200 determines that the content whose playback time is shorter than or equal to the preset time is the first type content having a high level of importance, and the content whose time is longer than the preset time can be determined as the second type content having a low importance level. In addition, the server 200 may determine that the content whose analysis period is shorter than or equal to the preset time is the first type content having a high importance level, and the content having the analysis period longer than the preset time as the second type content having a low importance level. The server 200 may transmit a fingerprint corresponding to a part of the fingerprints 510-1, 510-2, . . . , 510-n of the first type of content to the display apparatus 100.

Figure 6:
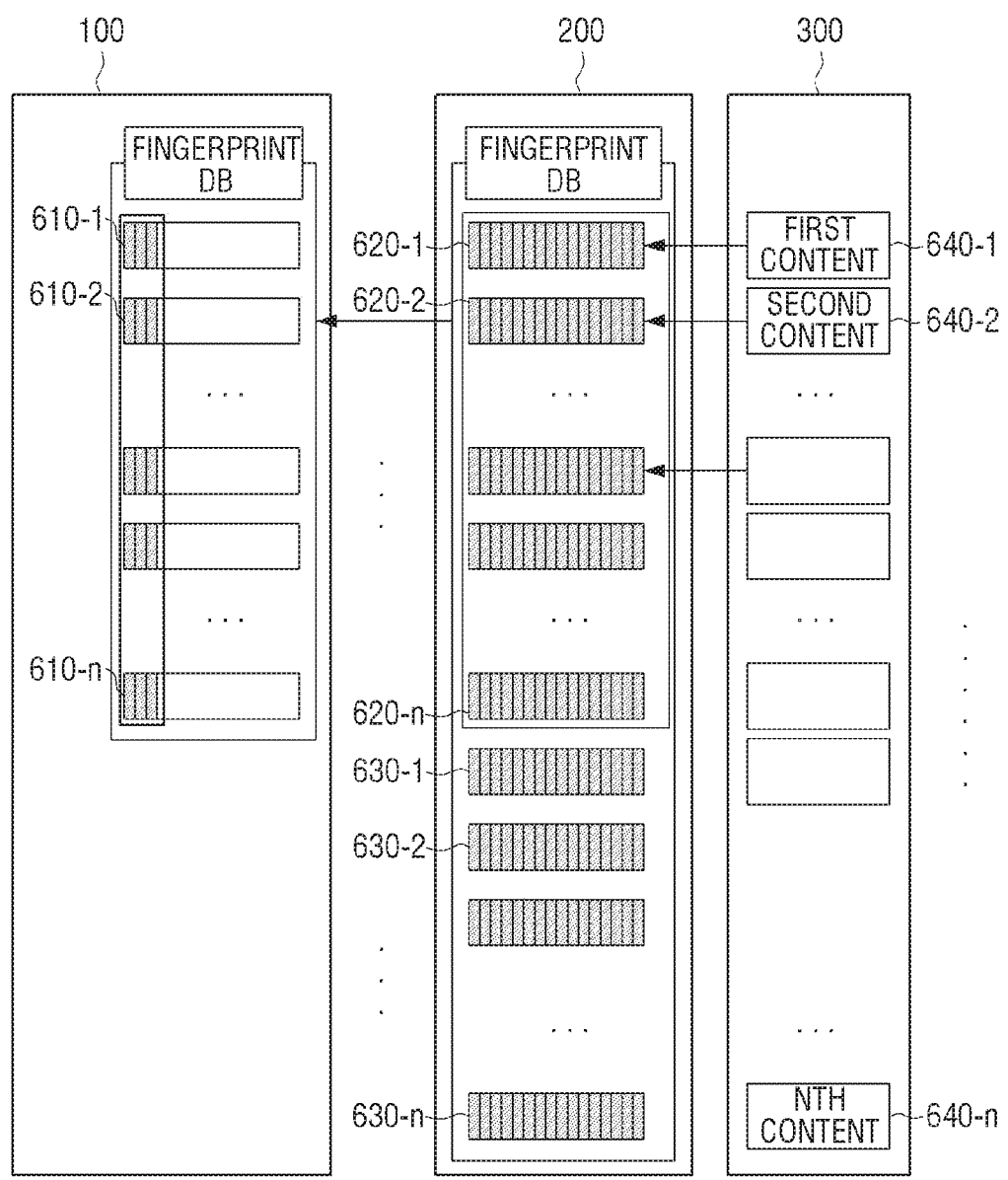

As illustrated in FIG. 6, the controller 270 may control the communicator 230 to receive the fingerprints 610-1, 620-2, . . . , 620-n corresponding to a part of the first type of content. Specifically, the controller 270 may control the communicator 230 to receive a fingerprint corresponding to a playback period of a predetermined time from the start of playback of the first type of content.

Figure 7:
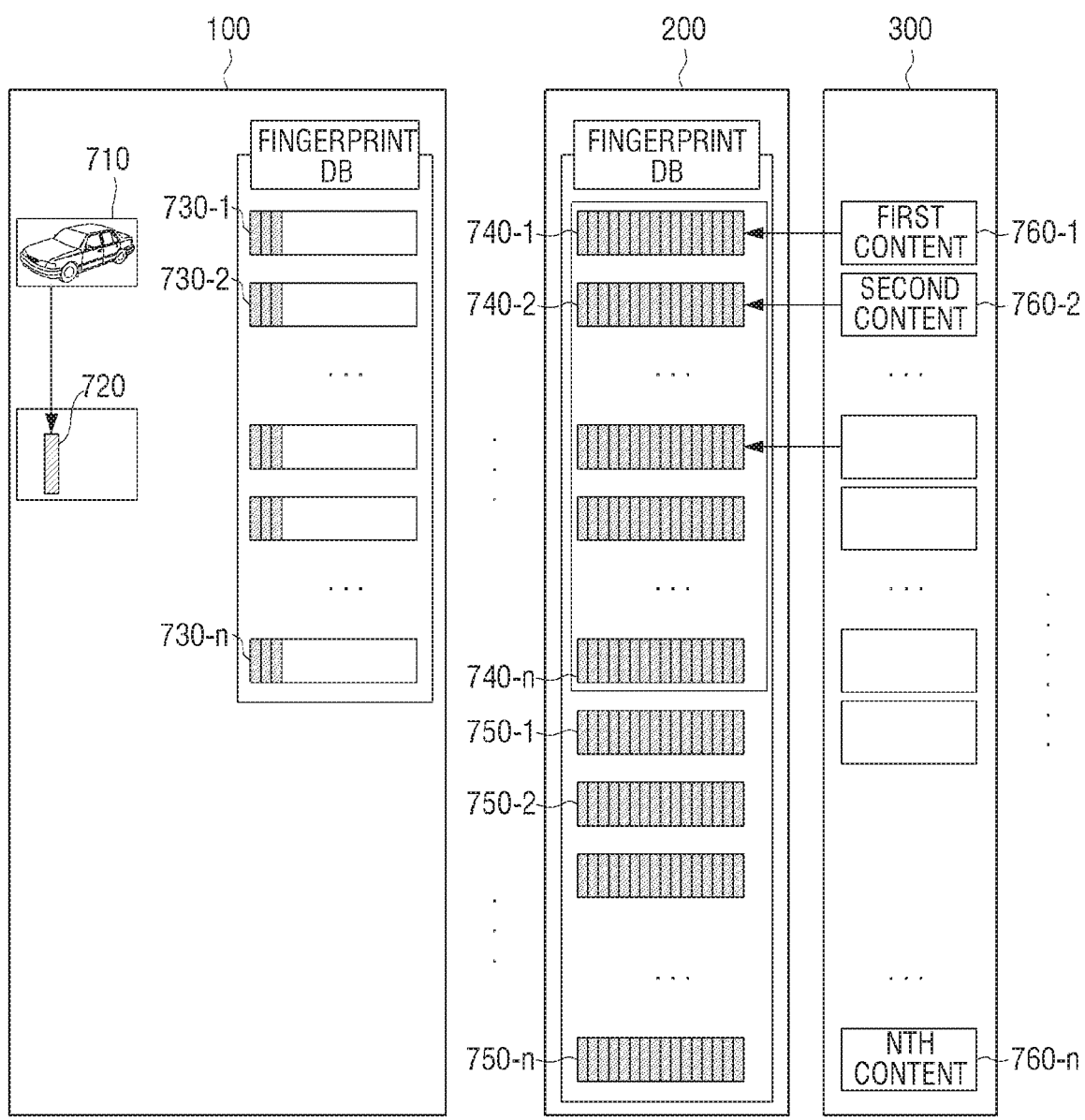

As illustrated in FIG. 7, the controller 270 may control the display unit 210 to display the content 710 and extract the fingerprint 720 of the displayed content 710. Specifically, the controller 270 can capture an image or audio of the displayed content, and extract the fingerprint using the captured image or audio. At this time, the fingerprint is an identifier capable of uniquely recognizing a video frame.

Figure 8:
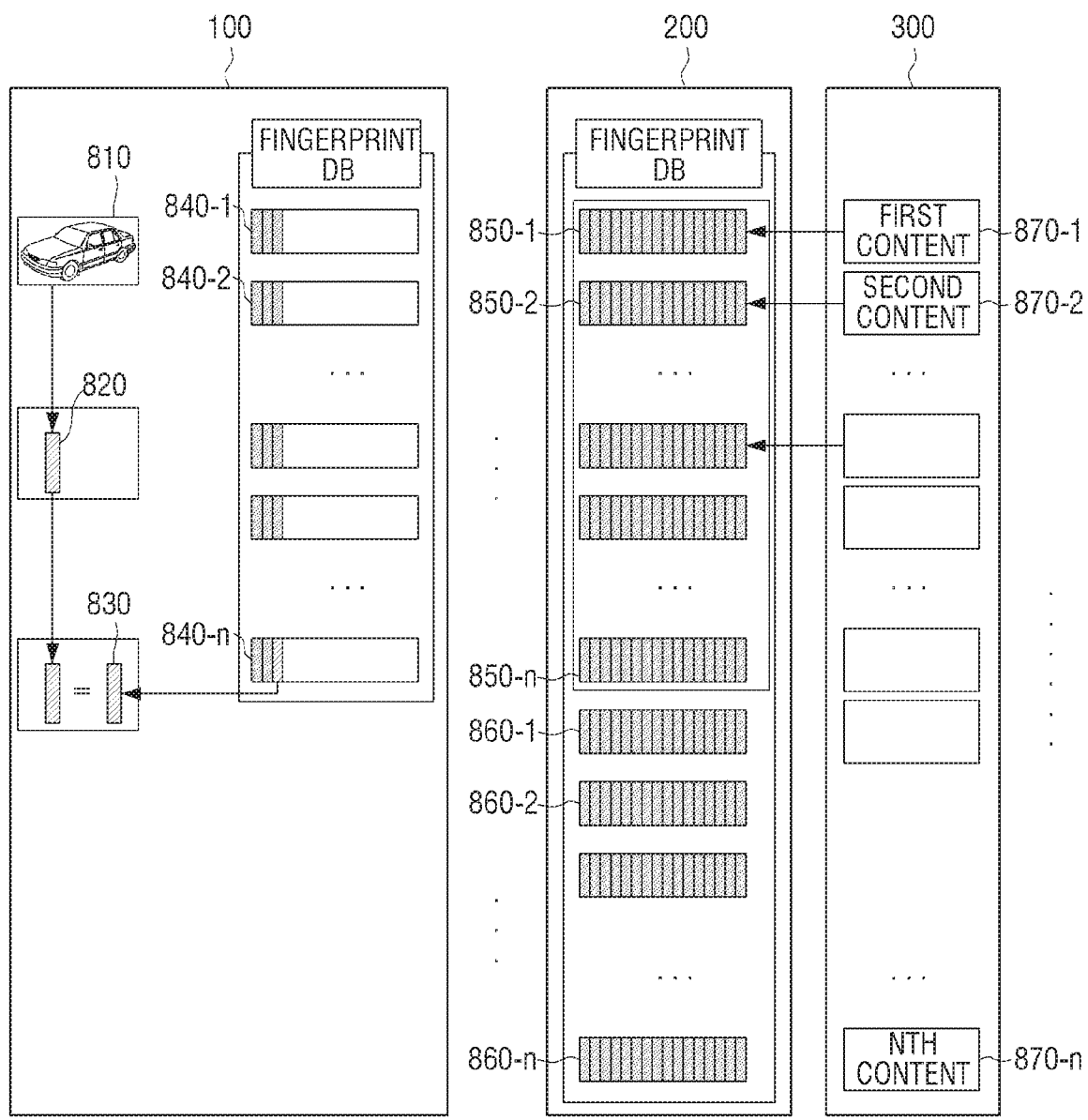
Figure 9:
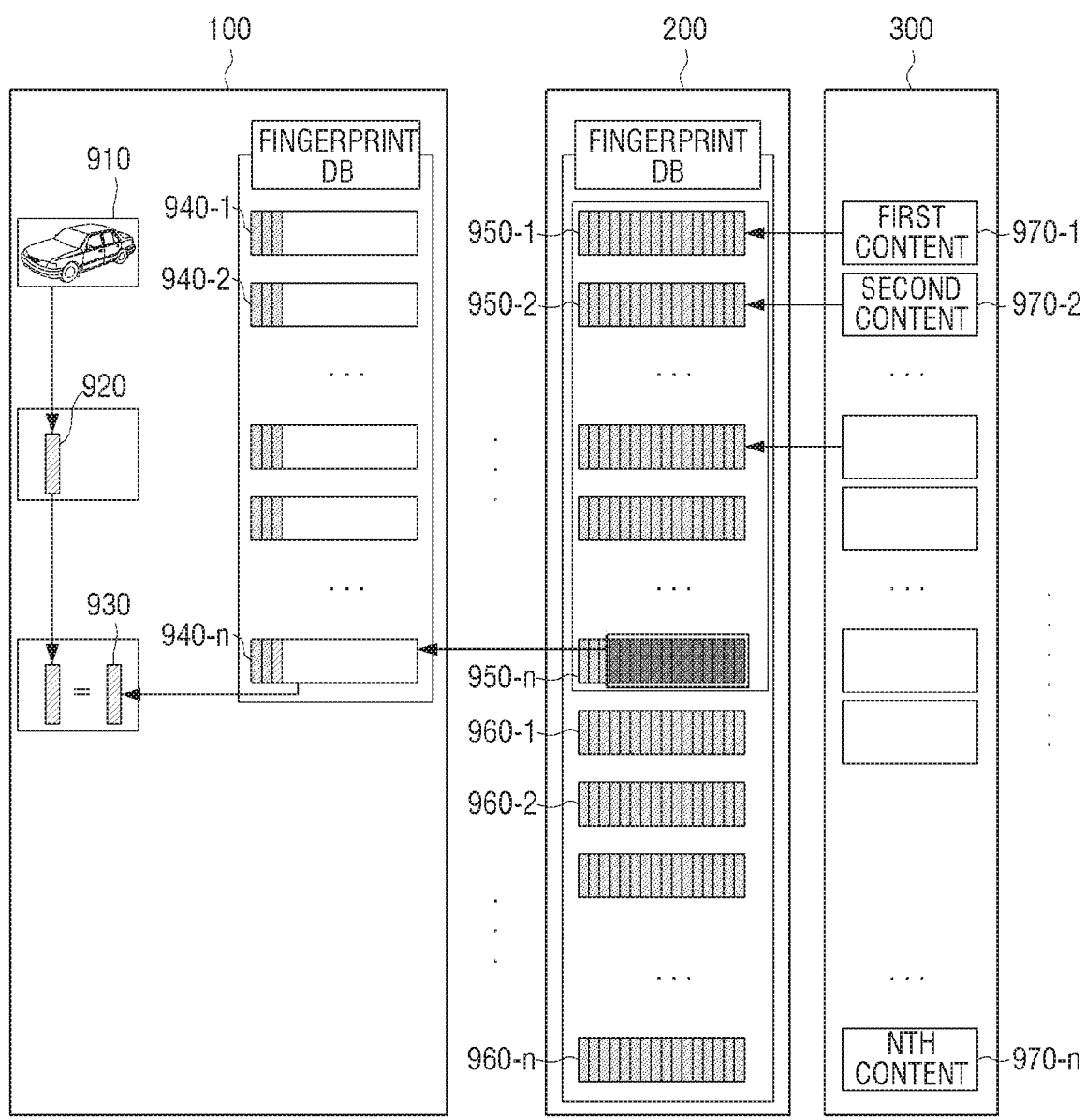

As illustrated in FIG. 8, the controller 270 may determine whether there is a fingerprint matched with the extracted fingerprint 820 from among the stored fingerprints 840-1, 840-2, . . . , 840-n. When there is a fingerprint matched with the extracted fingerprint 820 out of the stored fingerprints 840-1, 840-2, . . . , 840-n, the controller 270 may control the communicator 230 to receive a fingerprint corresponding to remaining sections of the content. Specifically, if the matched fingerprint corresponds to a type of the content, there is no longer a fingerprint corresponding to the remaining section of the content. Thus, the controller may determine whether the matched fingerprint is a fingerprint corresponding to the ending section of the content. If it is determined that the matched fingerprint does not correspond to the ending period of the content, the controller 270 determines whether or not the fingerprint corresponding to the remaining section of the content is stored in the storage 230, and prevent receiving of inefficient fingerprint. If the fingerprint corresponding to the remaining section of the content is not stored in the storage 230, the controller 270 may control the controller 230 to receive a fingerprint 950-n corresponding to the remaining section of the content as illustrated in FIG. 9.

Figure 10:
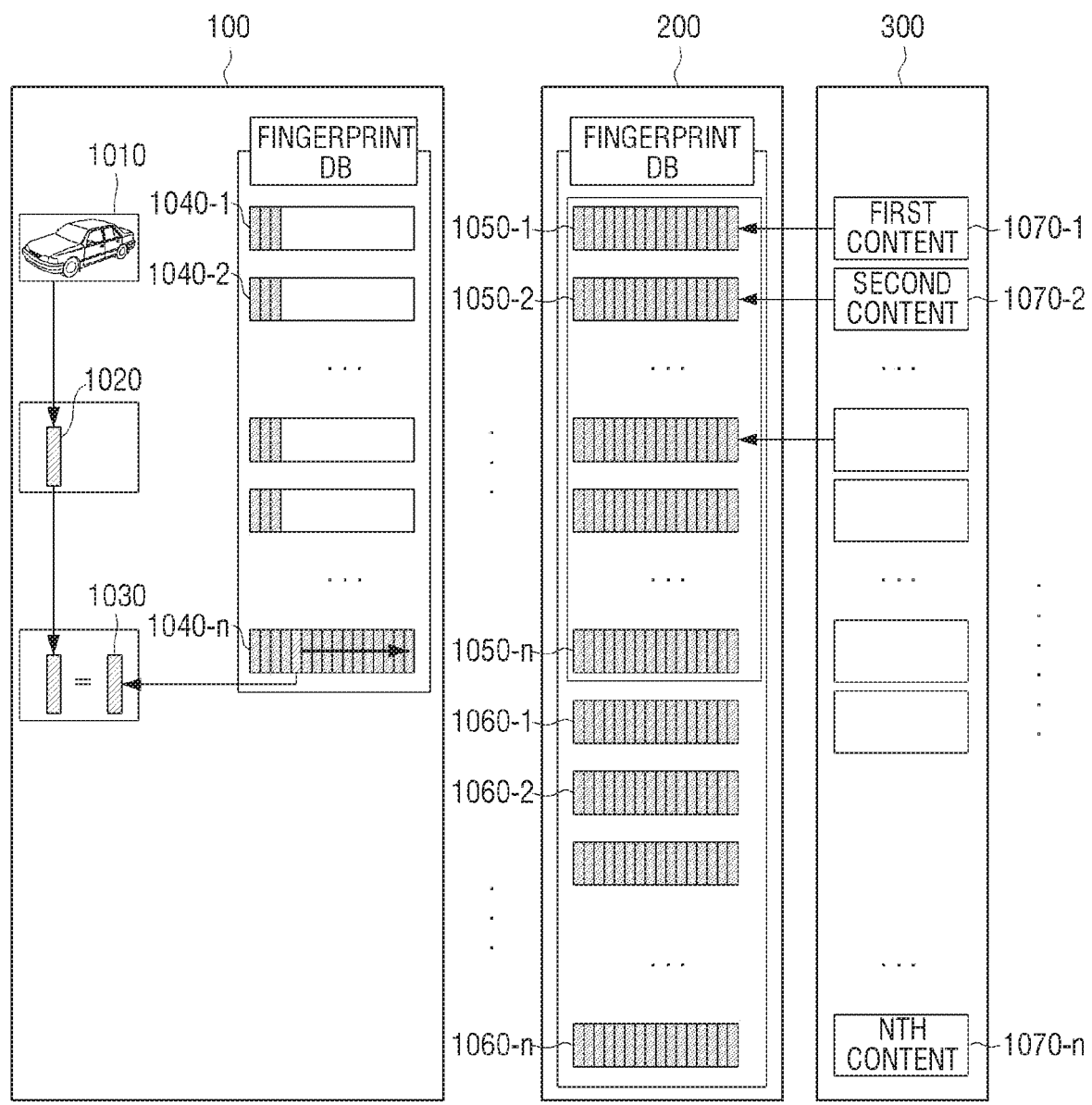

As shown in FIG. 10, the controller 270 may control the storage 240 to store the fingerprint 1040-n corresponding to the remaining section of the content. As a result, since the fingerprint 1040-n corresponding to the entire section of the content is stored in the storage 240, the controller 270 captures the content displayed in every predetermined period, extracts the fingerprint, and determines whether the fingerprint of the stored content matches the fingerprint of the stored content. For example, the controller 270 may capture the content displayed every 33 ms to extract the fingerprint, and determine whether the extracted fingerprint matches the fingerprint of the stored content.

Figure 11:
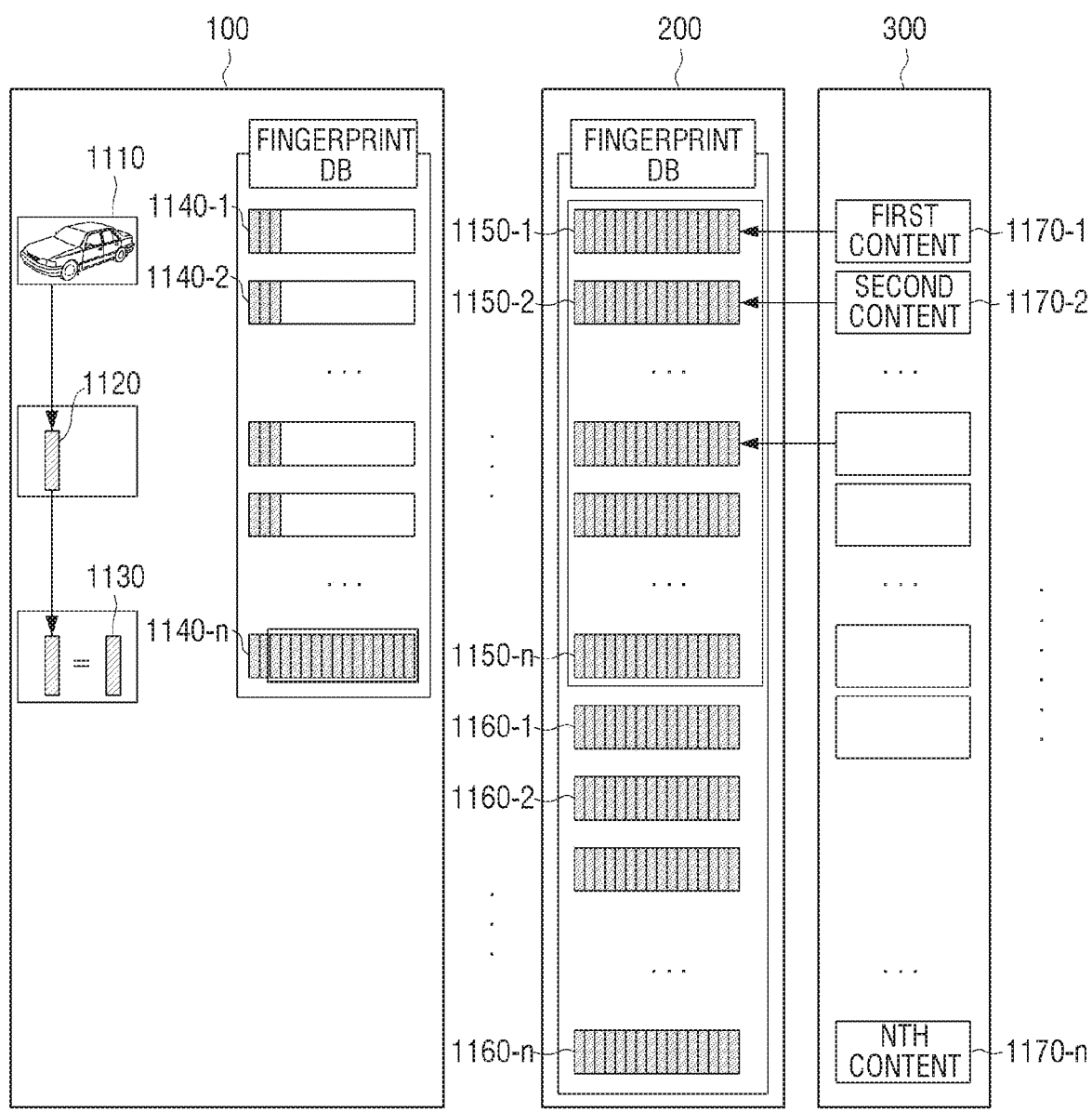

As illustrated in FIG. 11, when the extracted fingerprint 1120 is matched with the fingerprint 1130 corresponding to the ending period of the content, the controller 270 may control the storage 240 to delete the fingerprint 1140-n which corresponds to the remaining section of the content except a fingerprint corresponding to a part of the section of the content. Accordingly, by not storing the entire section of the fingerprint corresponding to a content of which playback is ended, a case in which a large number of contents are not stored due to lack of capacity of the storage 240 can be prevented.

Figure 12:
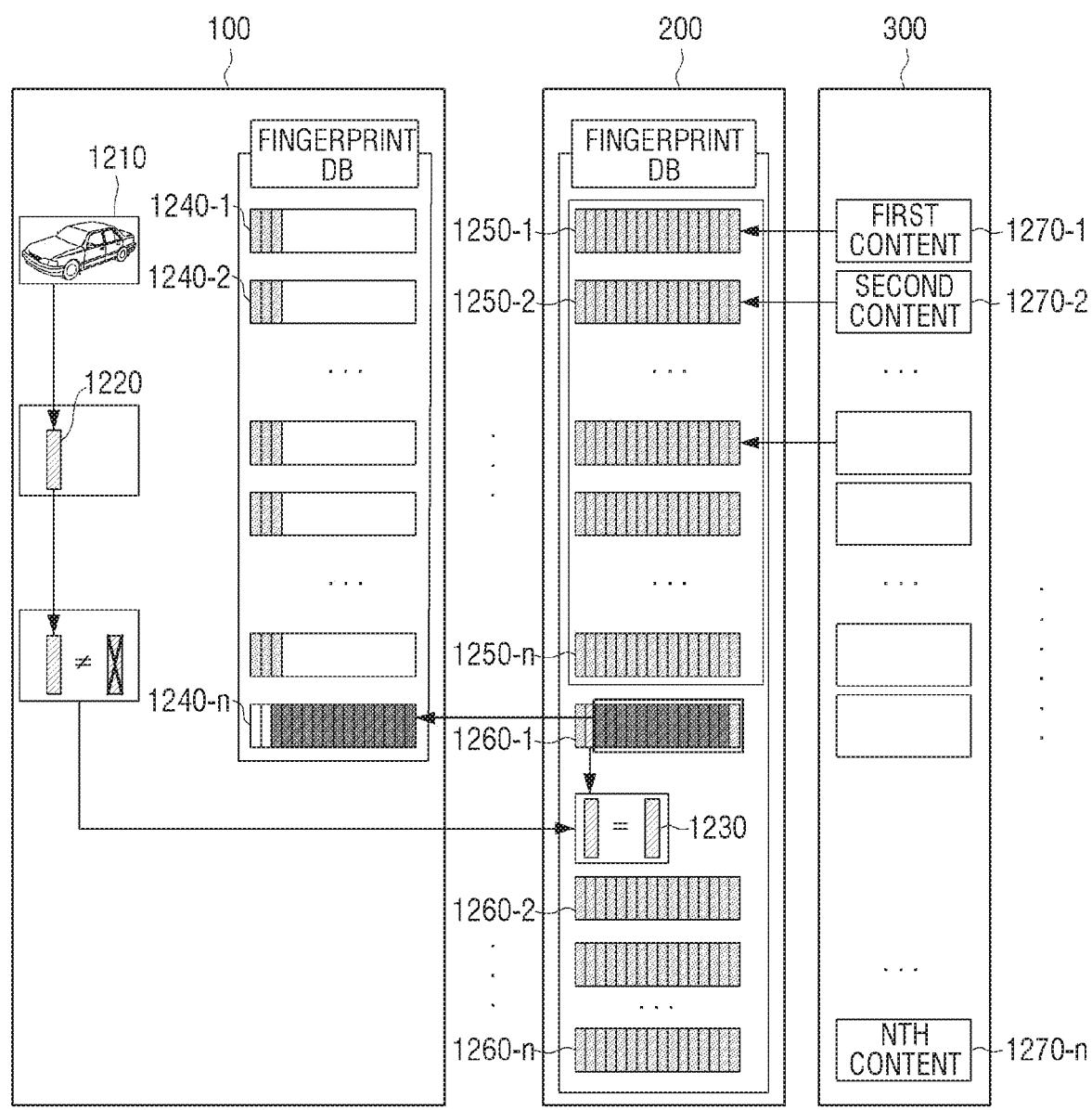

As illustrated in FIG. 12, when there is no fingerprint which matches the extracted fingerprint 1220 from the displayed content 1210 of the prestored fingerprints 1240-1,1240-2, . . . , 1240-n, the controller 270 may control the communicator 230 to transmit the extracted fingerprint 1220 to the server 200. The controller 270 may control the communicator 230 to receive the fingerprint 1260-1 corresponding to the content including the fingerprint 1230 matched with the fingerprint 1220 transmitted to the server 200. In the meantime, the content including the fingerprint 1230 matched with the transmitted fingerprint 1220 can be a second type fingerprint. In addition, the controller 270 may control the communicator 230 to receive a fingerprint corresponding to the remaining section of the content in which the matched fingerprint is included. Further, the controller 270 may control the storage 240 to store the fingerprint corresponding to the remaining section of the received content.

As a result, since the fingerprint 1260-1 corresponding to the remaining section of the content is stored in the storage 240, the controller 270 may capture the content displayed every predetermined period to extract the fingerprint, and determine whether the fingerprint of the stored content matches the fingerprint of the stored content. For example, the controller 270 may capture the content displayed every 33 ms, extract fingerprints, and determine whether the extracted fingerprints match the fingerprint of the stored content. If the extracted fingerprint 1220 is matched with the fingerprint 1230 corresponding to the ending period of the content, the controller 270 extracts the fingerprint corresponding to the remaining period of the content except for the fingerprint corresponding to the partial section of the content. The controller may control the storage 240 to delete the fingerprint 1240-n. Accordingly, it is possible to prevent a case in which a large number of contents cannot be stored according to the capacity of the storage 240, by not storing the entire section of the fingerprint corresponding to the content whose playback ended.

Figure 13:
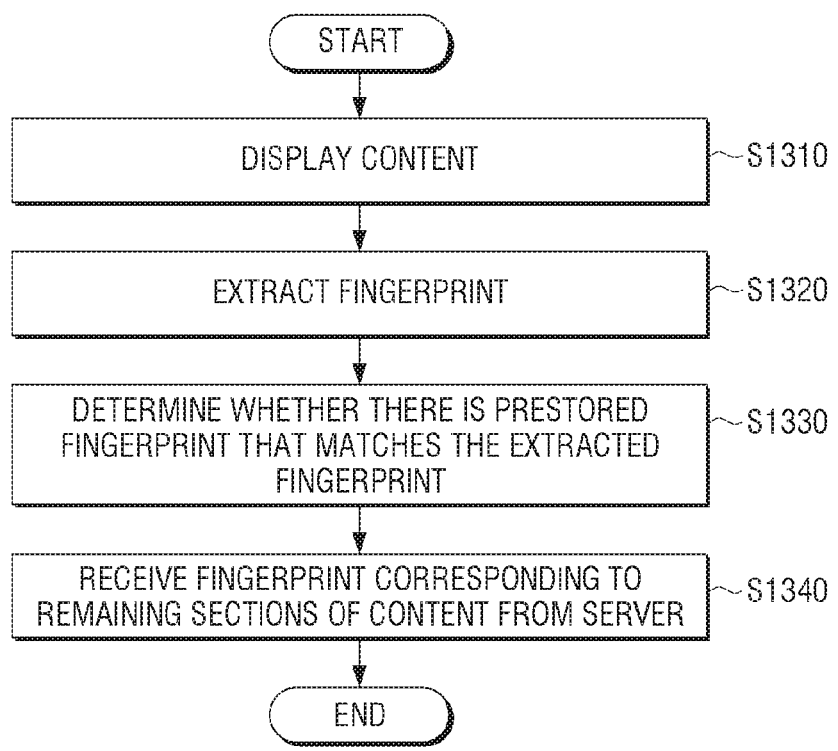
FIG. 13 is a flowchart to describe a control method of a display apparatus according to an exemplary embodiment.

Hereinbelow, a controlling method of the display apparatus 100 according to an exemplary embodiment will be described with reference to FIG. 13.

First of all, the display apparatus 100 displays a content 1310. To be specific, the display apparatus 100 may display an advertisement content or a broadcasting program and so on.

The display apparatus 100 extracts a fingerprint by capturing a displayed content. To be specific, the display apparatus 100 may capture an image or audio and extract a fingerprint of a displayed content using the captured image or audio.

Then, the display apparatus 100 determines whether there is a fingerprint matched with the fingerprint extracted from the previously stored fingerprint (S1330). At this time, the pre-stored fingerprint may be a fingerprint corresponding to a section of the first type content received from the server 100, and a section may be a section reproduced for a preset time from the start of reproduction. On the other hand, some sections need not necessarily be consecutive.

If there is a pre-stored fingerprint matching the extracted fingerprint, the display apparatus 100 receives the fingerprint corresponding to the remaining section of the content from the server 200 (S1340). If there is no pre-stored fingerprint matching the extracted fingerprint, the display apparatus 100 transmits the extracted fingerprint to the server 200, and receives a fingerprint of a content including the fingerprint matching the extracted fingerprint.

Meanwhile, the above-described method can be realized in a general-purpose digital computer that can be created as a program that can be executed by a computer and operates the program using a computer-readable recording medium. Further, the structure of the data used in the above-described method can be recorded on a computer-readable recording medium through various means. The computer-readable recording medium includes a storage medium such as a magnetic storage medium (e.g., a ROM, a floppy disk, a hard disk, etc.) and an optical reading medium (e.g., a CD-ROM, a DVD).

As described above, although the present disclosure has been described with reference to the embodiments and the accompanying drawings, it is to be understood that the present disclosure is not limited thereto, and various variations and modifications may be made by those skilled in the art without departing from the spirit and scope of the present disclosure as defined by the appended claims.

What is claimed is:

1. A control method of a display apparatus, the method comprising:
   displaying a content;
   extracting a fingerprint from the displayed content;
   identifying whether there is a prestored fingerprint matching the extracted fingerprint;
   when there is a prestored fingerprint matching the extracted fingerprint, receiving a fingerprint corresponding to remaining sections of the content from a server; and
   receiving a fingerprint corresponding to a part of the sections of a plurality of contents from the server and storing the same.

2. The method as claimed in claim 1, further comprising:
   when there is no prestored fingerprint matching the extracted fingerprint, transmitting the extracted fingerprint to the external server; and
   receiving a fingerprint of an entire section of a content matching the extracted fingerprint from the server.

3. The method as claimed in claim 2, when the extracted fingerprint is a fingerprint that is inserted in a middle of the matched content, the receiving comprises receiving a fingerprint corresponding to remaining sections of the matched content.

4. The method as claimed in claim 1, wherein the receiving further comprises:
   identifying whether a fingerprint corresponding to remaining sections of the content is stored; and
   when a fingerprint corresponding to the remaining sections is not stored, receiving a fingerprint corresponding to the remaining sections.

5. The method as claimed in claim 1, further comprising:
   storing the receiving fingerprint and updating the prestored fingerprint.

6. The method as claimed in claim 1, wherein the server identifies a first type content and a second type content according to a level of importance of the stored content, and the receiving and storing comprises receiving and storing a fingerprint corresponding to a part of sections of the first type content of which a level of importance is higher than a level of importance of the second type content.

7. The method as claimed in claim 1, wherein the server identifies a third type content and a fourth type content according to a reproduction time of the stored content, and wherein the receiving and storing comprises receiving and storing a fingerprint corresponding to a part of sections of the third type content of which a reproduction time is shorter than the fourth type content.

8. The method as claimed in claim 1, further comprising:
   when the reproduction of the content being ended, deleting a fingerprint corresponding to the received remaining section.

9. A display apparatus, comprising:
   a storage;
   a display;
   a communicator; and
   a controller configured to:
      control the display, extract a fingerprint from the displayed content, identify whether there is a prestored fingerprint that matches the extracted fingerprint, when there is a prestored fingerprint that matches the extracted fingerprint, controls the communicator to receive a fingerprint corresponding to remaining sections of the content,
   wherein the controller controls the communicator to receive a fingerprint which corresponds to a part of the sections of a plurality of contents and controls the storage to store the received fingerprint.

10. The display apparatus of claim 9, wherein the controller, when there is no prestored fingerprint that matches the extracted fingerprint, controls the communicator to transmit the extracted fingerprint to the server, and receive a fingerprint of an entire section of the content that matches the extracted fingerprint from the server.

11. The display apparatus of claim 10, wherein when the extracted fingerprint is a fingerprint that corresponds to a middle of the matched content, the controller controls the communicator to receive a fingerprint that corresponds to the remaining section of the matched content.

12. The display apparatus of claim 9, wherein the controller identifies whether a fingerprint which corresponds to the remaining section of the content is stored, and if a fingerprint which corresponds to the remaining section is not stored, controls the communicator to receive a fingerprint which corresponds to the remaining section.

13. The display apparatus of claim 9, wherein the controller stores the received fingerprint and updates the prestored fingerprint.

* * * * *